US012190868B2

(12) United States Patent
Braganza et al.

(10) Patent No.: US 12,190,868 B2
(45) Date of Patent: Jan. 7, 2025

(54) CUSTOMER ADVOCACY THROUGH A VIRTUAL ASSISTANT COUPLED TO A CONTACT CENTER

(71) Applicant: MITEL NETWORKS CORPORATION, Kanata (CA)

(72) Inventors: Jonathan Braganza, Ottawa (CA); Logendra Naidoo, Ottawa (CA)

(73) Assignee: Mitel Networks Corporation, Ontario (CA)

( * ) Notice: Subject to any disclaimer, the term of this patent is extended or adjusted under 35 U.S.C. 154(b) by 210 days.

(21) Appl. No.: 17/884,148

(22) Filed: Aug. 9, 2022

(65) Prior Publication Data

US 2024/0054993 A1    Feb. 15, 2024

(51) Int. Cl.
*H04M 3/493*    (2006.01)
*G06Q 30/016*    (2023.01)
*G10L 15/08*    (2006.01)

(52) U.S. Cl.
CPC ............ *G10L 15/08* (2013.01); *G06Q 30/016* (2013.01); *H04M 3/4936* (2013.01)

(58) Field of Classification Search
None
See application file for complete search history.

(56) References Cited

U.S. PATENT DOCUMENTS

| 10,795,640 | B1* | 10/2020 | Knight ............. | G06F 3/0487 |
| 2018/0012231 | A1 | 1/2018 | Sapoznik et al. | |
| 2019/0355042 | A1 | 11/2019 | Swierk et al. | |
| 2020/0311738 | A1* | 10/2020 | Gupta ............. | G06F 16/22 |
| 2022/0310083 | A1* | 9/2022 | Mohanty ......... | G06N 5/02 |
| 2023/0214847 | A1 | 7/2023 | Shawn et al. | |

FOREIGN PATENT DOCUMENTS

| CN | 112182178 A | 1/2021 |
| EP | 3790234 A1 | 3/2021 |

OTHER PUBLICATIONS

Daniel Jurafsky and James H. Martin, " Speech and Language Processing: Chapter 17 Information Extraction," Dec. 29, 2021, 25 pages.
Martin Blersch and Mathias Landhausser, "EASIER: An Approach to Automatically Generate Active Ontologies for Intelligent Assistants," Conference Paper, Jul. 2016, 7 pages, Karlsruhe Institute of Technology.
Martin Blersch et al., "Automatic Generation of Virtual Assistants from Databases using Active Ontologies," SEKE, 2019, 7 pages.
Michael Stewart et al., "ICDM 2019 Knowledge Graph Contest: Team UWA," Sep. 4, 2019, 6 pages, The University of Western Australia, Perth, Australia.

(Continued)

*Primary Examiner* — Quynh H Nguyen

(57) ABSTRACT

The technology disclosed herein includes analyzing a transcript of a communications session between a customer operating a customer device and a virtual assistant to determine a customer query; analyzing the customer query to generate supplemental information to respond to the customer query; and providing the supplemental information to the customer device by the virtual assistant.

17 Claims, 9 Drawing Sheets

(56) References Cited

OTHER PUBLICATIONS

Michele Seikel and Thomas Steele, "Comparison of Key Entities Within Bibliographic Conceptual Models and Implementations," LRTS 64, Apr. 2020, pp. 62-71, No. 2.
Rui Feng et al., "CERES: Pretraining of Graph-Conditioned Transformer for Semi-Structured Session Data," Apr. 8, 2022, 12 pages, Georgia Institute of Technology and Amazon Inc.
EP; Extended European Search Report dated Nov. 21, 2023 in Application Serial No. EP23190418.6.

* cited by examiner

CUSTOMER ADVOCACY THROUGH A VIRTUAL ASSISTANT COUPLED TO A CONTACT CENTER

FIELD OF THE DISCLOSURE

This disclosure relates generally to virtual assistants in computing systems, and more particularly, to assisting customers serviced by virtual assistants in a contact center supported by computing systems.

BACKGROUND

People around the world rely on their smart phones to make personal phone calls, contact businesses, get customer support and retrieve information. Some companies have introduced virtual assistants to provide users support using virtual assistant technology. Typically, virtual assistants are cloud-based and can assist wherever there is Internet access through a connection device (such as a smart phone).

While virtual assistants rely on the Internet and the initial configuration of programmed devices via specific application programming interfaces (APIs) to work properly, they are not very helpful during conversations. Virtual assistants are designed to accept certain predefined commands when spoken to and operate Internet-based requests or Internet of Things (IOT) devices, however they are trained to react to, not learn from, spoken dialog unless the dialog pertains to advertising intelligence. Further, it is not clear how private information is being utilized by the virtual assistant.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
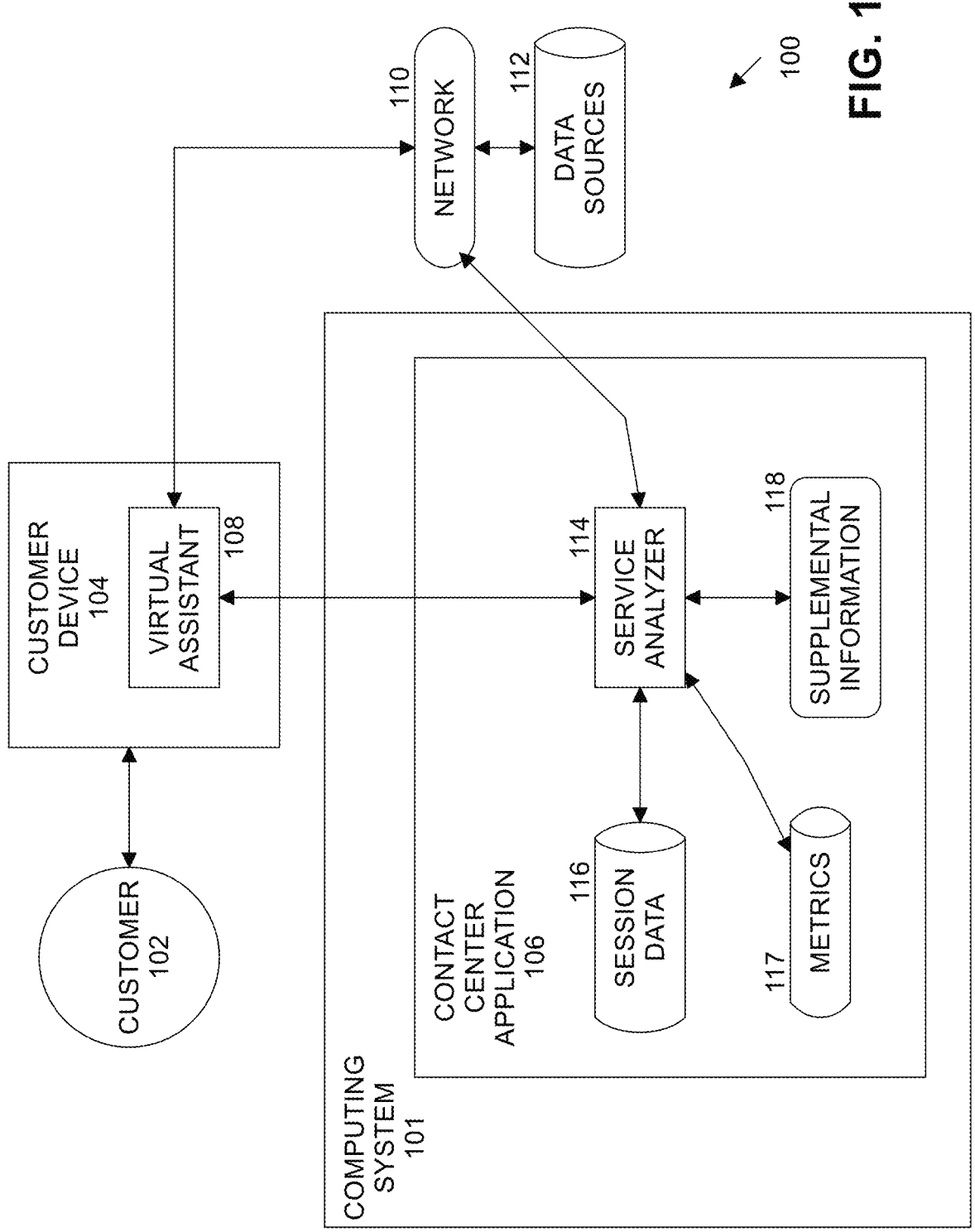
FIG. 1 illustrates a computing arrangement according to an example.

The technology described herein provides a method and system for handling customer support interactions in a computerized contact center using an intelligent and enhanced automated virtual assistant capability to capture audible and non-audible customer interactions, store the customer interactions, analyse the customer interactions, determine relevance and categorization, determine user queries from the customer interactions, and provide supplemental information to the customer based at least in part on the analysis of the customer interactions. The technology described herein captures relevant information for use in handling subsequent user queries from ongoing contact center customer interactions, thereby allowing the virtual assistant to model responses to future queries from a customer.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, a computing system can be, for example, a server, a disaggregated server, a personal computer, a workstation, a self-learning machine (e.g., a neural network), a mobile device (e.g., a cell phone, a smart phone, a tablet (such as an iPad™)), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device. Any computing system may be used to implement the contact center application described herein.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Existing virtual assistants (such as Google Assistant, Apple Siri, and Amazon Alexa, for example) learn historically from past conversations by storing recorded dialog for the purposes of pushing recommendations for advertisements, etc. The analysis is performed through artificial intelligence (AI) based algorithms to tailor future online experiences based on what the company is learning about customer preferences. Also, telephone calls are typically performed in isolation since the tradition is that the call is between the person calling and the person or company being called. Despite privacy concerns, users today may opt into privacy agreements or opt out. Regardless, phone calls are not typically subject to the same sorting or processing of preferences that is typically performed when accessing websites on the Internet. For example, if a customer is repeatedly looking up a topic in a browser, the browser has the real-time capability to suggest the same link to the customer (e.g., to save time for the customer).

One example of previous, albeit non-technical, solution is silent monitoring of a phone call by a human such as a receptionist or a secretary. There is no existing machine-based equivalency that assists a customer in a computerized contact center, automatically analyzes the conversations, and adaptively learns how best to serve the customer in a future interaction.

The technology disclosed herein proposes enhancements to the computerized customer support experience. By allowing service providers to share data (such as conversational dialog and contact center metrics) with the virtual assistants, the user of the device (the customer) is then able to receive additional supplemental information (e.g., cues) before, during, and even after the contact session. This may be accomplished using an application programming interface (API) permitting the service provider to automatically share useful information to the customer thereby pre-empting the need for the customer to make an additional call to the service provider for additional support. In an embodiment, the sharing of supplemental information is performed during the call.

The analysis of the past contact center interactions, as recorded/stored by the proposed enhanced virtual assistant service, includes searching for terms regarding what is being talked about, steps undertaken, topics under discussion, products in use, etc., to allow the enhanced virtual assistant service (embodied herein as a contact center application) to build a more relevant digital experience beyond the customer interaction (such as a call) itself. The availability of supplemental information to assist the customers when making a call to a service provider can stem the need to place further calls by customers. This improves the overall efficiency of the contact center.

Similarly, metrics may be provided to the customer, such as anticipated wait-time, system activity trends (such as an outage), and so on. In one implementation, the enhanced virtual assistant service may also prompt the customer to accept holding the customer's place in the support queue.

In one implementation, the computerized contact center experience is enhanced by integrating contact-center presence capabilities using existing virtual assistants (such as Google Assistant, Apple Siri, Amazon Alexa, etc.) running at least partially in a customer's device. The new functionality covered by the present disclosure proposes enhancements to existing in-call abilities by analyzing and learning from current and past contact center customer interactions. The past interactions are a goldmine of data to assist the customer making a current call and future calls to call centers may be prevented altogether. Customers contact a company looking for support and the enhanced virtual assistant service will intercede by providing supplemental information, such as self-help content. However, the technology described herein can also share relevant supplementary information once the call is underway or after the call is completed. In one implementation, the proposed method sharing metrics includes the use of existing application programming interfaces (APIs) (e.g., Xfinity™ Technical Support is vAssistant™ friendly).

In one implementation, contact center application software is equipped with added functionality to detect when a user has connected with a contact center. As used herein, the interaction between a customer and a contact center in one call is called a communications session. Typically, this connection will be made using a telephone (either a conventional phone or a smart phone) and the interaction will be at least partially audible (e.g., oral). In some interactions, the communications will be both audible (oral) and through selections made by the customer using a telephone keypad. Once the contact center application is alerted to the fact that a contact center communications session is underway, the contact center application automatically and immediately starts to analyze the communications session. The contact center application learns from the interactions with the customer during the communications session to complement and enhance the knowledge-transfer between the contact center agent and customer. When a customer receives support from an agent, the dialog is recorded and transcribed, and then analyzed to determine what is being discussed. For example, certain topics (under discussion) are then used to form the basis of future requests for supplemental information by the virtual assistant service. If a customer hears from a contact center agent, for example, "how to restart their modem", the contact center application learns about this advice and may provide additional relevant support (e.g., supplemental information) to the customer after the call has finished.

The sharing of information during the contact center communications session may also be performed through APIs that fully integrate the knowledge transfer between the contact center application and an existing virtual assistant. The contact center application can provide supplemental information (e.g., self-help content) or wait queue metrics regarding the session to the customer via the virtual assistant. Some of the virtual assistants may, for example, have the capability to tell the customer how much time the customer needs to "wait on hold", or the virtual assistant may even wait on hold for them, and then notify the customer when an agent is ready to speak to them.

FIG. 1 illustrates a computing arrangement 100 according to some embodiments. A customer 102 uses a customer device 104 to contact a contact center application 106 being executed by a computing system 101. In one example, the customer device 104 is a smart phone or ordinary telephone. In another example, the customer device 104 is a computing system, such as a personal computer, tablet computer, personal digital assistant, etc. The customer device 104 interacts with contact center application 106 either audibly (verbally, orally) or via textual input data (chat, direct messages (DMs), etc.). In either case, virtual assistant 108 of customer device 104 receives and interprets the input from the customer and sends information to the contact center application 106.

Contact center application 106 comprises a system to handle customer interactions. In one implementation, contact center application is an application program being executed by computing system 101 (e.g., a server). Information obtained from customer interactions by virtual assistant 108 may be forwarded to service analyzer 114. In an example, virtual assistant 108 may be an existing virtual assistant technology. In another example, virtual assistant 108 may be a custom virtual assistant specific to a company, organization, or other entity providing call center services and may run either on customer device 104 or computing system 101. Service analyzer 114 analyzes the customer interaction information (as described in further detail below with respect to FIGS. 2-5), stores at least a portion of the customer interaction information as session data 116 and provides one or more of metrics 117 data and/or supplementary information 118 to the customer device 104 based at least in part on analysis of the customer interaction. Both virtual assistant 108 and service analyzer 114 may request and receive information from one or more data sources 112 over network 110 (e.g., the Internet or an intranet). Data sources 112 may be, for example, any internal or external database, website, data repository, etc. Any such information received by contact center application 106 may be stored as needed as supplemental information 118 for future provision to customer devices or sent in real-time to customer device 104 during the current session. Supplemental information 118 may be categorized according to problem domains, technologies, products, company business organizations, company departments, customer problems, technical support, billing, etc.

Metrics 117 data comprises any information relating to one or more customer calls to the contact center. For example, metrics data may include time of call, length of call, queue length, anticipated wait time, volume of calls per unit time, etc.

Although only one contact center application is shown for simplicity in FIG. 1, in practice in any given computing environment (such as a large-scale cloud computing environment) there may be any number of computing systems executing a plurality of contact center applications coupled over a network (either a public network such as the Internet or a private network (e.g., an intranet)). For example, the number of computing systems and contact center applications may be in the thousands, tens of thousands, or even hundreds of thousands in a large-scale cloud computing environment operated by a cloud service provider (CSP).

Figure 2:
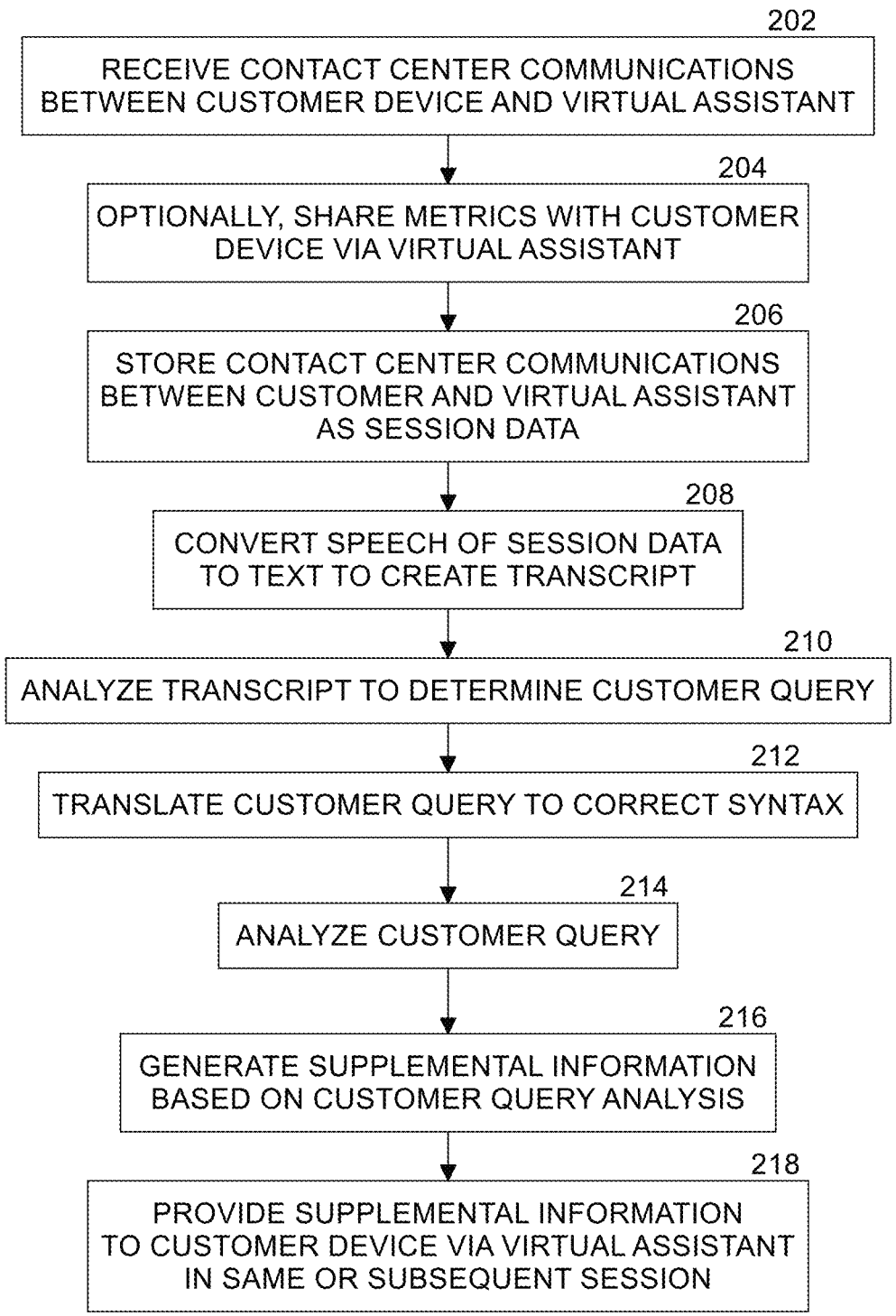
FIG. 2 is a flow diagram of contact center application processing according to an example.

FIG. 2 is a flow diagram of contact center application processing 200 according to some embodiments. At block 202, communications data is received between customer device 104 and virtual assistant 108 of the contact center application 106. Communications data may be received via a telephone call (e.g., capturing and recording audible voice/speech) or other input (e.g., text, instant message, characters entered by the customer, etc.). At block 204, optionally, metrics 117 data may be shared with the customer device 104 via the virtual assistant 108. At block 206, the contact center communications between the customer device 104 and the virtual assistant 108 is stored as session data 116. At block 208, service analyzer 114 of contact center application 106 converts the (recorded) speech of the session data 116 to text to create a transcript (when the communications are audio calls). If the communications are already in textual form, this action may be omitted. If the customer interactions are both speech and text, the speech as converted to text and text input may be combined. In an embodiment, the transcript is generated from the customer interaction using a speech to text process, such as the speech-to-text function available from Google.

At block 210, service analyzer 114 analyzes the transcript to determine one or more customer queries. In an embodiment, customer query may include information about one or more wait times of the customer's session. Further details of block 210 are shown in FIG. 3.

Figure 3:
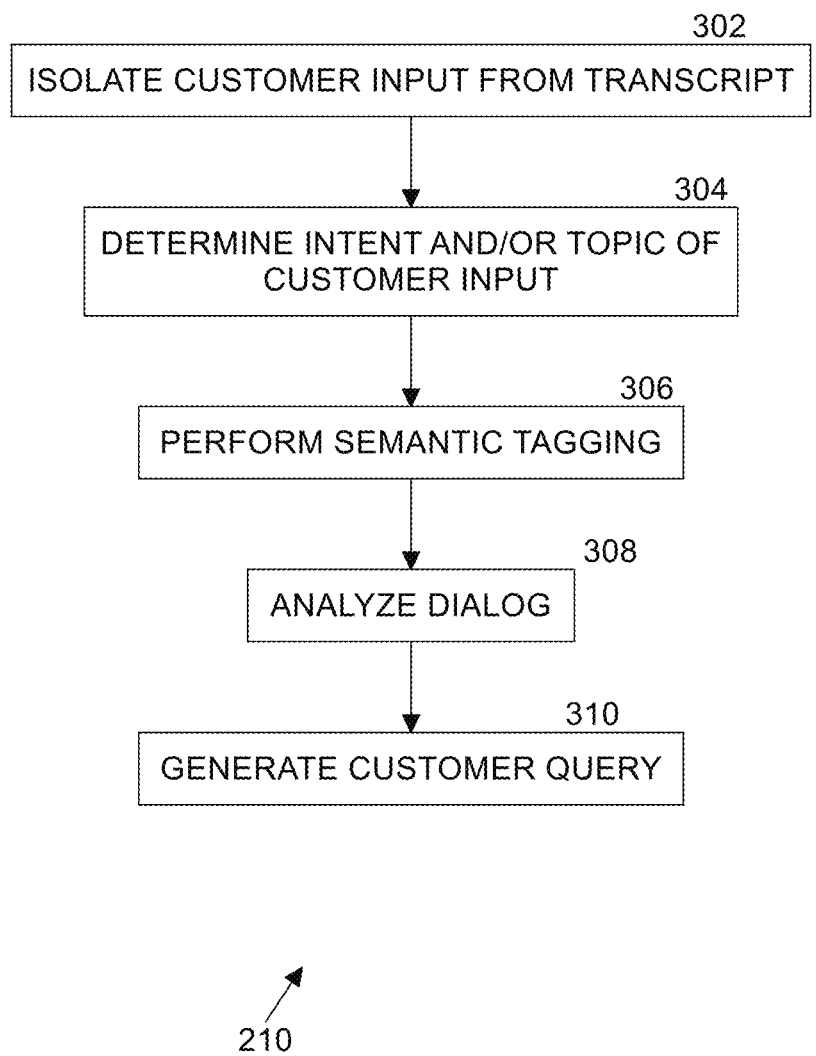
FIG. 3 is a flow diagram of processing to analyze a transcript to determine a user query according to an example.

FIG. 3 is a flow diagram of processing from block 210 to analyze a transcript to determine a customer query according to some embodiments. At block 302, service analyzer 114 isolates the customer input from the transcript. At block 304, service analyzer 114 determines the intent and/or topic of the customer input. At block 306, service analyzer 114 performs semantic tagging. At block 308, service analyzer 114 analyzes dialog of the customer input. At block 310, service analyzer 114 generates a customer query from results of blocks 302-308.

Returning to FIG. 2, at block 212, service analyzer 114 translates the customer query to a correct syntax prior to analyzing the customer query. At block 214, service analyzer 114 analyzes the customer query (now in the correct syntax) using an active ontology model.

In an example, analyzing the customer query is performed using an active ontology model. Ontology is a formal description of knowledge as a set of concepts within a domain and the relationships that hold between them. To enable such a description, components of the customer communications are formally specified as individuals (instances of objects), classes, attributes and relations as well as restrictions, rules and axioms. As a result, ontologies not only introduce a shareable and reusable knowledge representation but can also add new knowledge about the domain.

Figure 4:
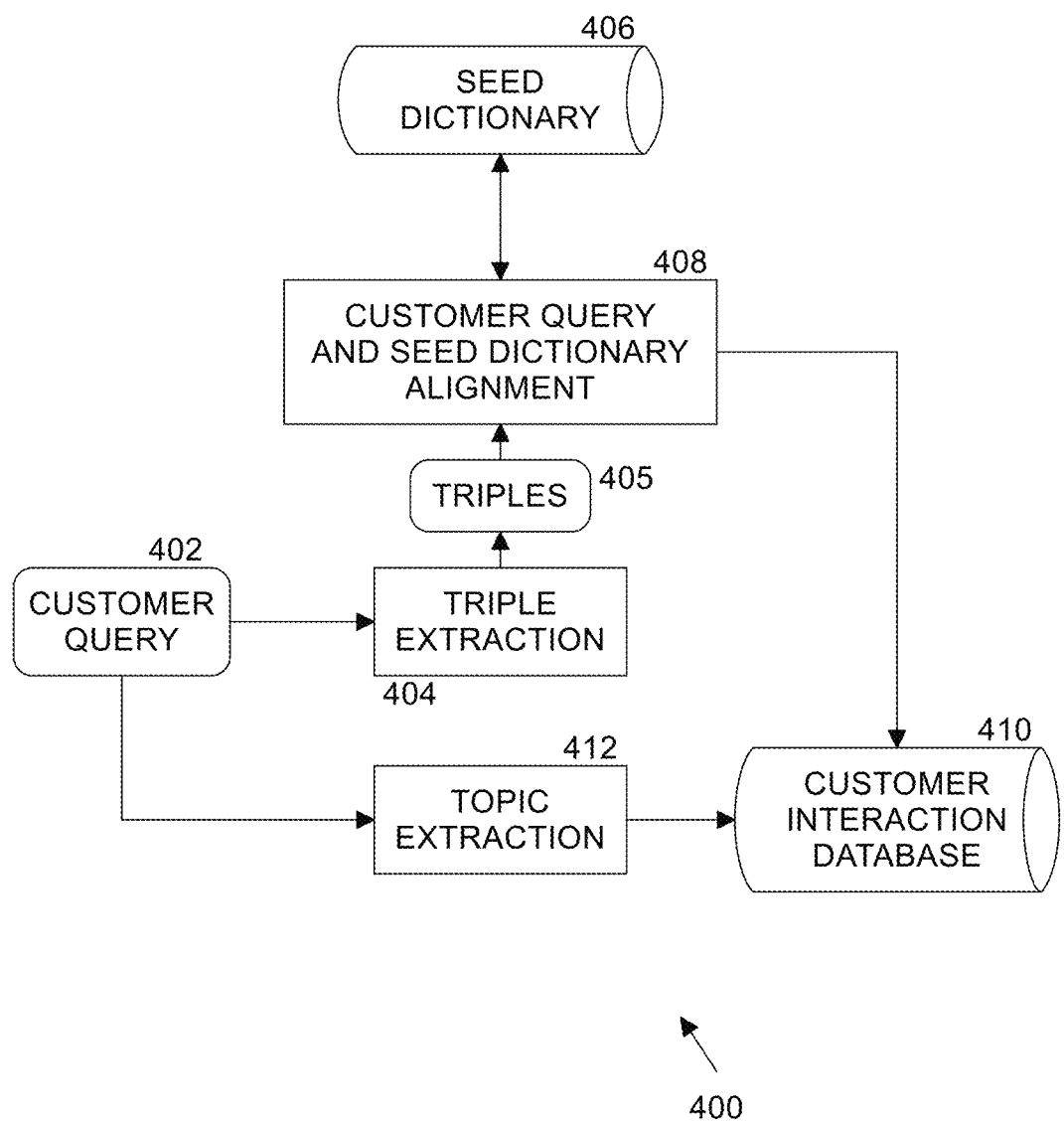
FIG. 4 is a diagram of analyzing a customer query according to an example.

FIG. 4 is a diagram of a process 400 for analyzing customer query 402 according to an example. Triple extraction 404 extracts relationships between entities and objects of the customer query. These relationships may be represented as triples 405. In an example, the triple comprises an entity and a relationship between the object and the entity and may be stored in entity-relationship-entity format. For example, see "Comparison of Key Entities within Bibliographic Conceptual Models and Implementations: Definitions, Evolutions, and Relationships" by Michele Seikel and Thomas Stele, Library Resources & Technical Services, Vol. 64, No. 2, April 2020. In an example, triple extraction may be performed as described in "ICDM 2019 Knowledge Graph Contest: Team UWA" by Michael Stewart, et al., Institute of Electrical and Electronics Engineers (IEEE) International Conference on Data Mining (ICDM), Sep. 4, 2019. In other implementations, other processes of triple extraction may be used. For example, for the phrase "I want a refund" the triple may be ("I" (entity), "want" (relationship), "refund" (entity).

Seed dictionary 406 comprises a collection of linguistic rules and/or interactions between customer interaction-based artifact. The rules may be based on language constructs, such as parts of speech (e.g., adjective, noun, verb, etc.). Seed dictionary may be fixed and pre-existing or may be updated over time based on customer interactions. In an embodiment, triples determined by triple extraction 404 may be stored in seed dictionary 406 so that generated triples from one customer query may be used in for processing future customer queries.

Customer query and seed dictionary alignment 408 compares the triples 405 extracted from the customer query 402 against data in seed dictionary 406. In an embodiment, this is known as alignment. During alignment, new entity/relationships may be uncovered between known objects in the transcript. For example, alignment may be performed as described in "CERES: Pre-Training of Graph-Conditioned Transformer for Semi-Structured Session Data" by Rui Feng, et al., arXiv.org, Apr. 8, 2022.

Topic extraction 412 categorizes text (sentences, phrases, paragraphs, etc.) of customer query 402 and segments the customer query into discrete bins (e.g., topics). For example, the phrase "I want a refund" may be grouped into a topic for "grievances/refunds". Many approaches to topic extraction are known in the field of natural language processing (NLP). In an example, the process described in "An Overview of Topics Extraction in Python with LDA" by Felix Revert, Dec. 17, 2018, may be used. In other implementations, other topic extraction processes may be used.

The combination of at least triple extraction 404, customer query and seed alignment dictionary 408 and topic extraction 412 may result in triples, topic metadata, and (optionally) wait time being stored in customer interaction database 410. In an embodiment, customer interaction database 410 comprises all information extracted from the transcript and the original conversation between an agent and the customer (e.g., the session data).

Figure 5:
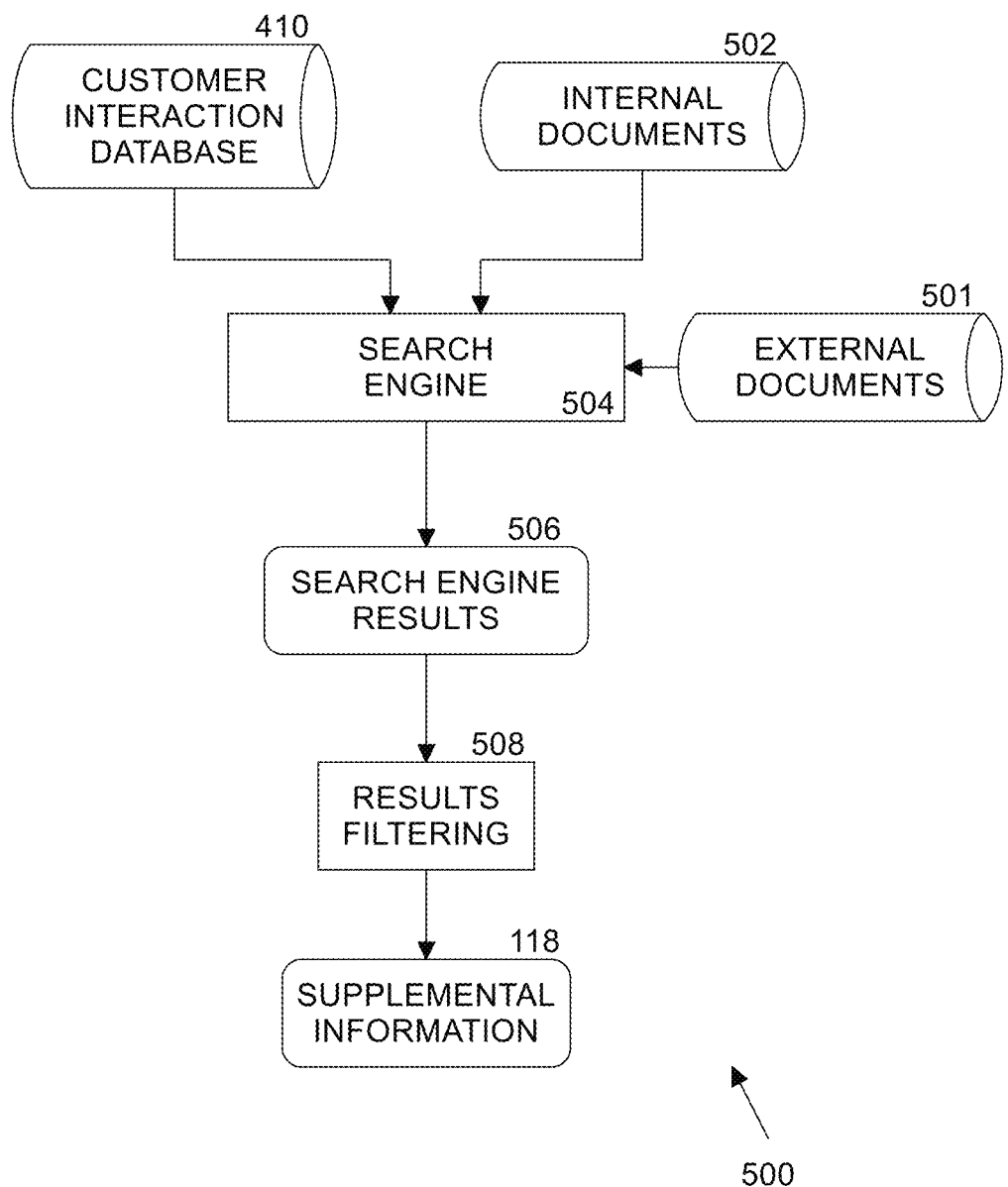
FIG. 5 is a diagram of generating supplemental information according to an example.

At block 216, service analyzer generates (or obtains) supplemental information 118 in response to the customer query based at least in part on the result of the customer query analysis of block 214. FIG. 5 is a diagram of generating 500 supplemental information 118 according to an example. Search engine 504 automatically generates appropriate search queries based at least in part on the customer query 402 and the information stored in customer interaction database 410 to search external documents 501 (e.g., web pages, FAQs, user manuals, public documentation, etc.) available over a publicly accessible network such as the Internet and company-specific internal documents 502 (e.g., company-specific FAQs, operations documentation, policies, product information, product manuals, user manuals, warranties, return policies, etc.) that may be available over a private intranet within an organization. Search engine 504 applies the search query to the public and private collections of available information to return search engine results 506. In an embodiment, search engine results 506 comprises the most relevant documents in response to the search query. For example, if the search query includes the triple ("I", "want", "refund"), the search engine results 506 may include a FAQ document regarding refunds. Search engine results 506 may be filtered according to any criteria by results filtering 508 to generate supplemental information 118.

At block 218, contact center application 106 provides supplemental information 118 to customer device 104 via the virtual assistant 108 in the same session (e.g., in real-time on the same call) or a subsequent session.

At any time during performance of block 208 to block 214, service analyzer 114 may obtain additional information needed to perform analysis of customer input from data sources 112 (e.g., database available over the Internet or an intranet).

While an example manner of implementing the technology described herein is illustrated in FIGS. 1-5, one or more of the elements, processes, and/or devices illustrated in FIGS. 1-5 may be combined, divided, re-arranged, omitted, eliminated, and/or implemented in any other way. Further, the example processor circuitry may be implemented by hardware, software, firmware, and/or any combination of hardware, software, and/or firmware. Thus, for example, any of the example processor circuitry, the example memory circuitry, the example communication interface circuitry, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example processor circuitry, the example memory circuitry, and/or the example communication interface circuitry is/are hereby expressly defined to include a non-transitory computer readable storage device or storage disk such as a memory, a digital versatile disk (DVD), a compact disk (CD), a Blu-ray disk, etc., including the software and/or firmware. Further still, the example computing environment of FIG. 1 may include one or more elements, processes, and/or devices in addition to, or instead of, those illustrated in FIG. 1, and/or may include more than one of any or all the illustrated elements, processes and devices.

A flowchart representative of example hardware logic circuitry, machine readable instructions, hardware implemented state machines, and/or any combination thereof for implementing the computing system 101 of FIG. 1 is shown in FIGS. 2-5. The machine readable instructions may be one or more executable programs or portion(s) of an executable program for execution by processor circuitry, such as the processor circuitry 712 shown in the example processor platform 700 discussed below in connection with FIG. 6 and/or the example processor circuitry discussed below in connection with FIGS. 7 and/or 8. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 2-5, many other methods of implementing the example computing system 101 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine readable media, as used herein, may include machine readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 2-5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media. When the machine readable instructions are executed, they cause the processor to perform certain actions as defined by the instructions.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 6:
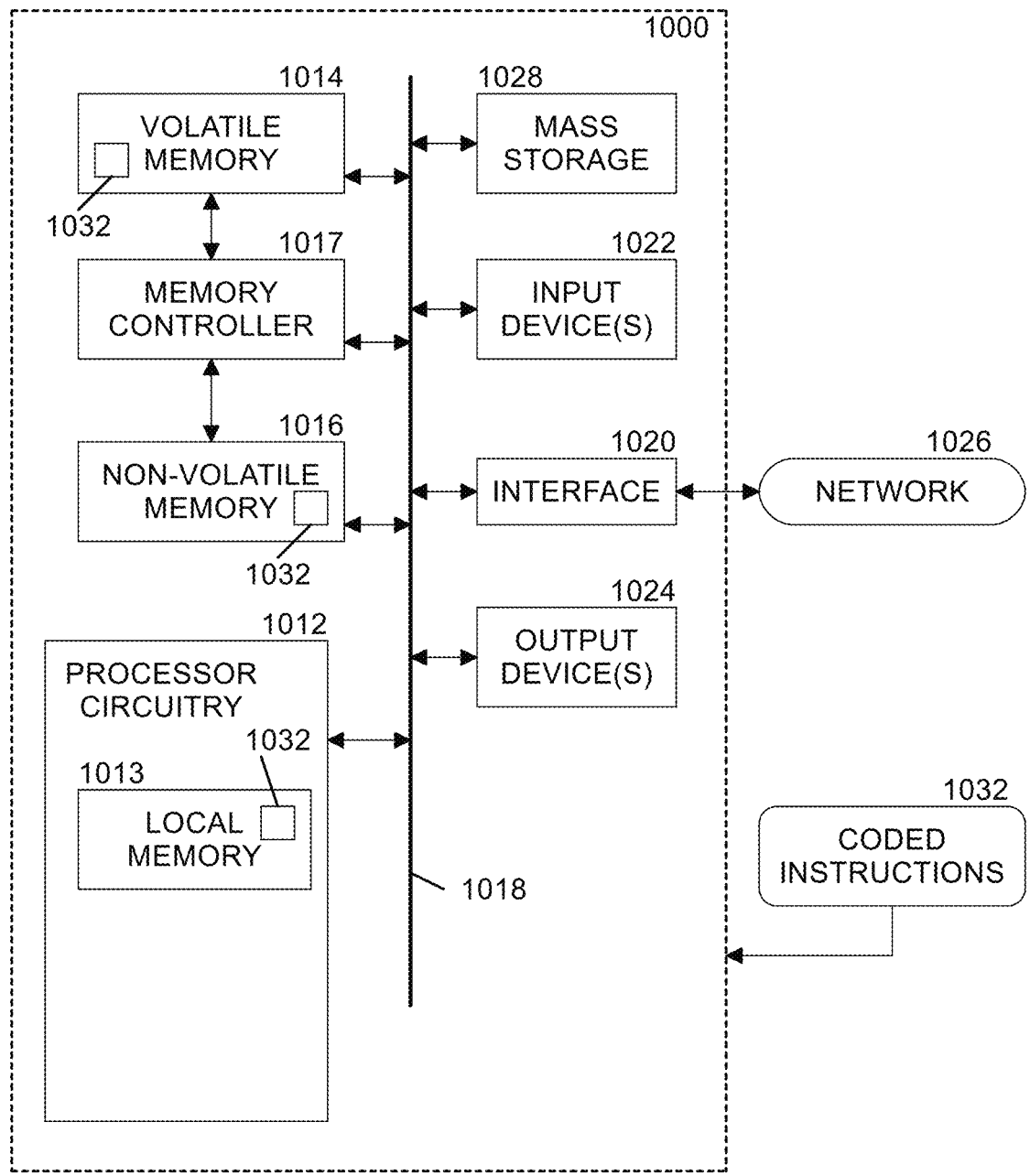
FIG. 6 is a block diagram of an example processor platform structured to execute and/or instantiate the machine-readable instructions and/or operations of FIGS. 1-5 to implement the apparatus discussed with reference to FIG. 1.

FIG. 6 is a block diagram of an example processor platform 1000 structured to execute and/or instantiate the machine-readable instructions and/or operations of FIGS. 2-5 to implement the computing system 101 of FIG. 1. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements processing capabilities of computing system 101.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine-readable instructions of FIGS. 2-5, may be stored in the mass storage device 1028, in the volatile memory 1014, in the non-volatile memory 1016, and/or on a removable non-transitory computer readable storage medium such as a CD or DVD.

Figure 7:
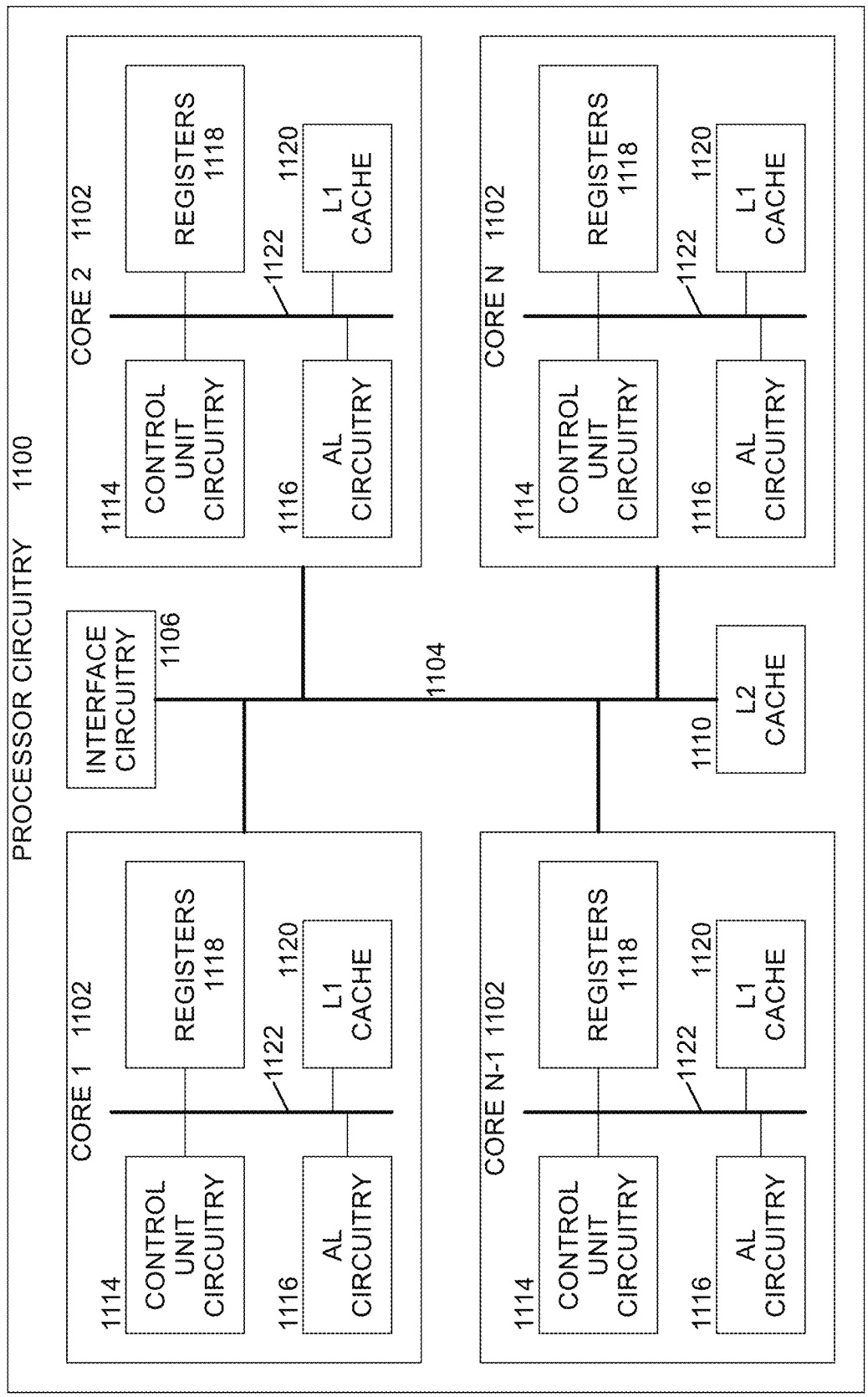
FIG. 7 is a block diagram of an example implementation of the processor circuitry of FIG. 6.

FIG. 7 is a block diagram of an example implementation of the processor circuitry 1012 of FIG. 6. In this example, the processor circuitry 1012 of FIG. 7 is implemented by a microprocessor 1100. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all the machine-readable instructions and/or operations represented by the flowcharts of FIGS. 2-5.

The cores 1102 may communicate by an example bus 1104. In some examples, the bus 1104 may implement a communication bus to effectuate communication associated with one(s) of the cores 1102. For example, the bus 1104 may implement at least one of an Inter-Integrated Circuit (I2C) bus, a Serial Peripheral Interface (SPI) bus, a PCI bus, or a PCIe bus. Additionally or alternatively, the bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 6). Typically, higher levels of memory in the hierarchy exhibit lower access time and have smaller storage capacity than lower levels of memory.

Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and an example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer-based operations. In other examples, the AL circuitry 1116 also performs floating point operations. In yet other examples, the AL circuitry 1116 may include first AL circuitry that performs integer-based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 6. Alternatively, the registers 1118 may be organized in any other arrangement, format, or structure including distributed throughout the core 1102 to shorten access time. The bus may implement at least one of an I2C bus, a SPI bus, a PCI bus, or a PCIe bus.

Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general-purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
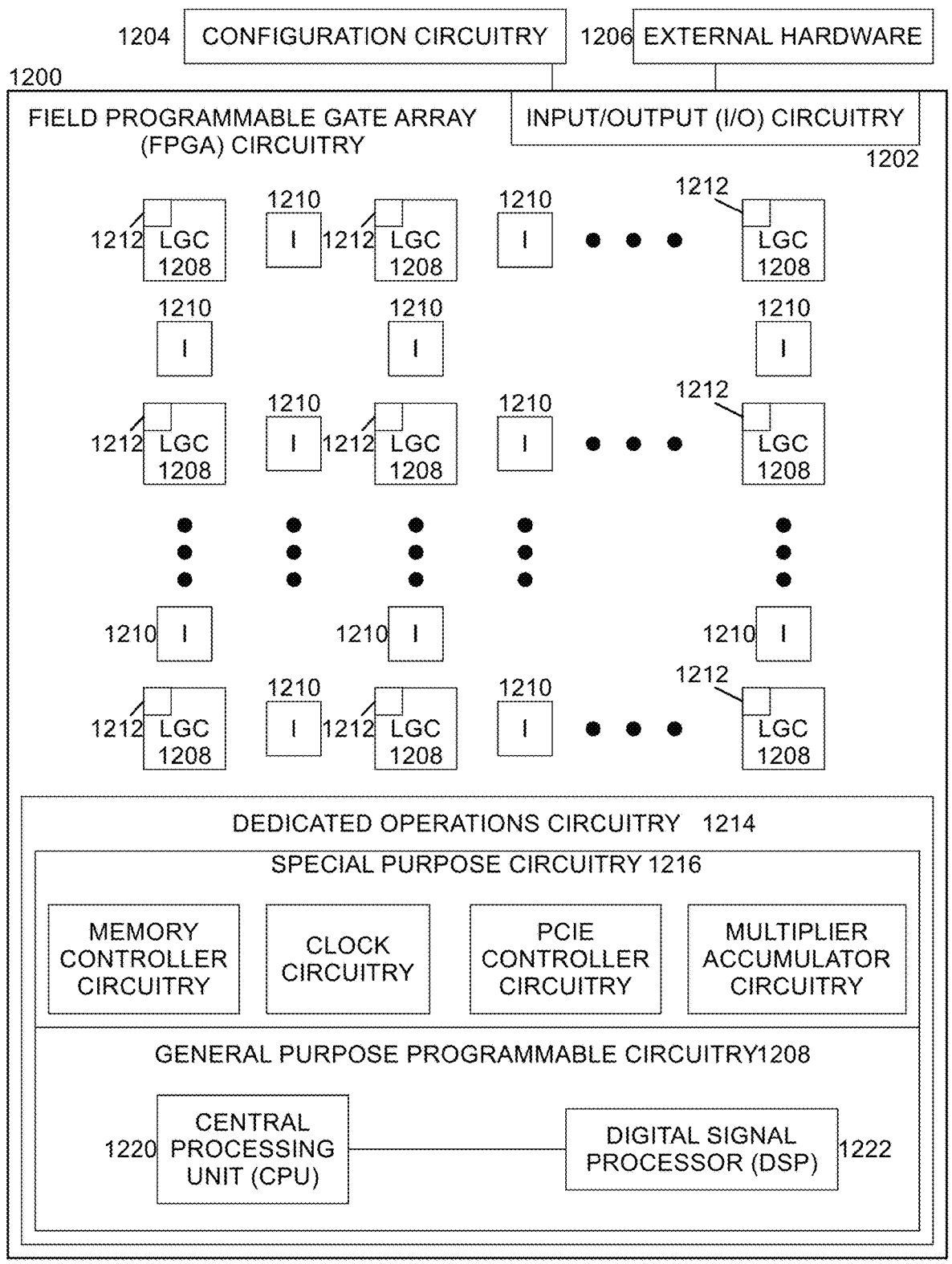
FIG. 8 is a block diagram of another example implementation of the processor circuitry of FIG. 6.

FIG. 8 is a block diagram of another example implementation of the processor circuitry 1012 of FIG. 6. In this example, the processor circuitry 1012 is implemented by FPGA circuitry 1200. The FPGA circuitry 1200 can be used, for example, to perform operations that could otherwise be performed by the example microprocessor 1100 of FIG. 8 executing corresponding machine-readable instructions. However, once configured, the FPGA circuitry 1200 instantiates the machine-readable instructions in hardware and, thus, can often execute the operations faster than they could be performed by a general-purpose microprocessor executing the corresponding software.

More specifically, in contrast to the microprocessor 1100 of FIG. 6 described above (which is a general purpose device that may be programmed to execute some or all of the machine readable instructions represented by the flowcharts of FIGS. 2-5 but whose interconnections and logic circuitry are fixed once fabricated), the FPGA circuitry 1200 of the example of FIG. 8 includes interconnections and logic circuitry that may be configured and/or interconnected in different ways after fabrication to instantiate, for example, some or all of the machine readable instructions represented by the flowcharts of FIGS. 2-5. In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 2-5. As such, the FPGA circuitry 1200 may be structured to effectively instantiate some or all of the machine-readable instructions of the flowcharts of FIGS. 2-5 as dedicated logic circuits to perform the operations corresponding to those software instructions in a dedicated manner analogous to an ASIC. Therefore, the FPGA circuitry 1200 may perform the operations corresponding to the some or all of the machine-readable instructions of FIGS. 2-5 faster than the general-purpose microprocessor can execute the same.

Figure 9:
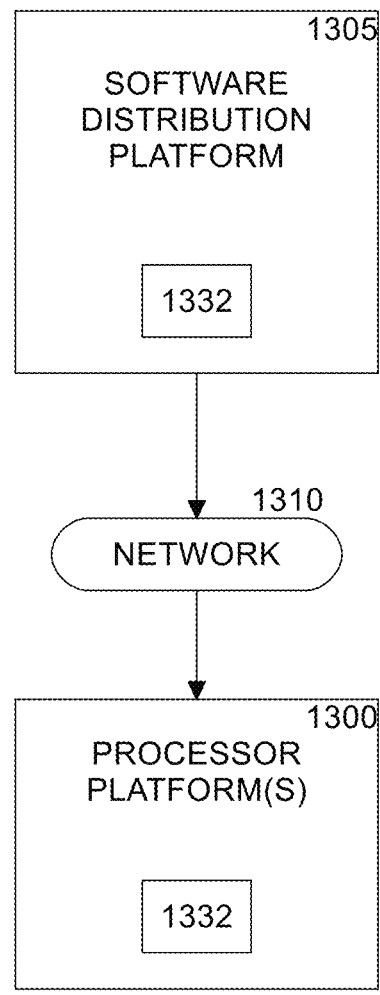
FIG. 9 is a block diagram illustrating an example software distribution platform to distribute software such as the example machine readable instructions of FIGS. 1-5 to hardware devices owned and/or operated by third parties.

In the example of FIG. 8, the FPGA circuitry 1200 is structured to be programmed (and/or reprogrammed one or more times) by an end user by a hardware description language (HDL) such as Verilog. The FPGA circuitry 1200 of FIG. 8, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 6. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine-readable instructions of FIGS. 2-5 and/or other desired operations. The logic gate circuitry 1208 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 9 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 7 and 8 illustrate two example implementations of the processor circuitry 1012 of FIG. 6, many other approaches are contemplated. For example, as mentioned above, modern FPGA circuitry may include an on-board CPU, such as one or more of the example CPU 1220 of FIG. 8. Therefore, the processor circuitry 1012 of FIG. 6 may additionally be implemented by combining the example microprocessor 1100 of FIG. 7 and the example FPGA circuitry 1200 of FIG. 8. In some such hybrid examples, a first portion of the machine-readable instructions represented by the flowcharts of FIGS. 2-5 may be executed by one or more of the cores 1102 of FIG. 7 and a second portion of the machine-readable instructions represented by the flowcharts of FIGS. 2-5 may be executed by the FPGA circuitry 1200 of FIG. 8.

In some examples, the processor circuitry 1012 of FIG. 6 may be in one or more packages. For example, the processor circuitry 1100 of FIG. 7 and/or the FPGA circuitry 1200 of FIG. 8 may be in one or more packages. In some examples, an XPU may be implemented by the processor circuitry 1012 of FIG. 6, which may be in one or more packages. For example, the XPU may include a CPU in one package, a DSP in another package, a GPU in yet another package, and an FPGA in still yet another package.

A block diagram illustrating an example software distribution platform 1305 to distribute software such as the example machine readable instructions 1032 of FIG. 6 to hardware devices owned and/or operated by third parties is illustrated in FIG. 9. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 6. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine-readable instructions 1032, which may correspond to the example machine readable instructions, as described above. The one or more servers of the example software distribution platform 1305 are in communication with a network 1310, which may correspond to any one or more of the Internet and/or any of the example networks, etc., described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 1032 from the software distribution platform 1305. For example, the software, which may correspond to the example machine readable instructions described above, may be downloaded to the example processor platform 1300, which is to execute the machine-readable instructions 1032 to implement the methods described above and associated computing system 101. In some examples, one or more servers of the software distribution platform 1305 periodically offer, transmit, and/or force updates to the software (e.g., the example machine readable instructions 1032 of FIG. 6) to ensure improvements, patches, updates, etc., are distributed and applied to the software at the end user devices.

In some examples, an apparatus includes means for processing operations of computing system 101 of FIG. 1. For example, the means for processing contact center application 106 of computing system 101 may be implemented by processor circuitry, processor circuitry, firmware circuitry, etc. In some examples, the processor circuitry may be implemented by machine executable instructions executed by processor circuitry, which may be implemented by the example processor circuitry 1012 of FIG. 6, the example processor circuitry 1100 of FIG. 7, and/or the example Field Programmable Gate Array (FPGA) circuitry 1200 of FIG. 8. In other examples, the processor circuitry is implemented by other hardware logic circuitry, hardware implemented state machines, and/or any other combination of hardware, software, and/or firmware. For example, the processor circuitry may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

From the foregoing, it will be appreciated that example systems, methods, apparatus, and articles of manufacture have been disclosed that provide defect scanning of components in a computing system. The disclosed systems, methods, apparatus, and articles of manufacture improve the efficiency of using a computing device by detecting when defects occur in components. The disclosed systems, methods, apparatus, and articles of manufacture are accordingly directed to one or more improvement(s) in the operation of a machine such as a computer or other electronic and/or mechanical device.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the examples of this patent.

What is claimed is:

1. A method implemented on a computing system, wherein the method comprises:
    analyzing a transcript, by a service analyzer of a contact center application being executed by the computing system, of a communications session between a customer operating a customer device and a virtual assistant to determine a customer query;
    the service analyzer analyzing the customer query and a search engine generating supplemental information from a customer interaction database including extracted information from the transcript and an original conversation between an agent and a customer, the customer interaction database including the supplemental information stored in response to the customer query, wherein analyzing the customer query further comprises:
    extracting one or more triples describing relationships between entities and objects of the customer query;
    aligning the one or more triples with a seed dictionary including a collection of linguistic rules based in part on customer-based artifact;
    extracting one or more topics from the customer query by categorizing text of the customer query and segmenting the customer query into a plurality of discrete bins; and
    storing one or more aligned triples and one or more topics in the customer interaction database; and
    the contact center application sending the supplemental information during the communication session or in a subsequent communication session to the customer device by the virtual assistant.

2. The method of claim 1, comprising providing the supplemental information to the customer device in real-time during the communications session.

3. The method of claim 1, comprising translating the customer query to a correct syntax prior to analyzing the customer query.

4. The method of claim 1, comprising receiving communications data from the communications session from the virtual assistant via an application programming interface (API), storing the communications data as session data, and converting recorded speech of the session data into text to create the transcript.

5. The method of claim 1, comprising providing the supplemental information from a service analyzer of the contact center application to the virtual assistant via an application programming interface (API).

6. The method of claim 1, wherein analyzing the transcript to determine the customer query comprises isolating customer input data from the transcript, determining at least one of an intent and topic of the customer input data, performing semantic tagging of the customer input data, analyzing dialog of the customer input data, and analyzing one or more of the at least one of intent and topic, semantic tagging, and analyzed dialog to determine the customer query.

7. The method of claim 1, comprising generating the supplemental information by generating a search query from the customer query and the customer interaction database, executing the search query by a search engine from at least one of internal documents and external documents, and filtering results of the search engine.

8. The method of claim 1, comprising updating the seed dictionary with the one or more triples.

9. At least one non-transitory machine-readable storage medium operable on a computer and comprising instructions that, when executed, cause at least one processor of the computer to:
    analyze, using a service analyzer of a contact center application, a transcript of a communications session between a customer operating a customer device in communication with the contact center application and a virtual assistant to determine a customer query;
    the service analyzer analyzing the customer query and a search engine generating supplemental information from a customer interaction database including extracted information from the transcript and an original conversation between an agent and a customer, the customer interaction database including the supplemental information in response to the customer query;
    the contact center application sending the supplemental information during the communication session or in a subsequent communication session to the customer device by the virtual assistant; and
    wherein the instructions when executed further cause the at least one processor to
        direct the contact center application, when analyzing the customer query, to extract one or more triples describing relationships between entities and objects of the customer query;
        align the one or more triples with a seed dictionary including a collection of linguistic rules;
        extract one or more topics from the customer query by categorizing text of the customer query and segmenting the customer query into a plurality of discrete bins; and
        store one or more aligned triples and one or more topics in the customer interaction database.

10. The at least one non-transitory machine-readable storage medium of claim 9 comprising instructions that, when executed, cause at least one processor to:
    provide the supplemental information to the customer device in real-time during the communications session.

11. The at least one non-transitory machine-readable storage medium of claim 9, wherein instructions to analyze the transcript to determine the customer query comprise instructions when executed to isolate customer input data from the transcript, determine at least one of an intent and topic of the customer input data, perform semantic tagging of the customer input data, analyze dialog of the customer input data, and analyze one or more of the at least one of intent and topic, semantic tagging, and analyzed dialog to determine the customer query.

12. The at least one non-transitory machine-readable storage medium of claim 9, wherein instructions to generate the supplemental information comprise instructions when executed to generate a search query from the customer query and the customer interaction database, execute the search query by a search engine from at least one of internal documents and external documents, and filter results of the search engine.

13. The at least one non-transitory machine-readable storage medium of claim 9, comprising instructions, when executed to provide metrics data to the customer device, the metrics data comprising anticipated wait time.

14. An electronic computing apparatus comprising:
a memory to store instructions; and
a processor, coupled to the memory, configured to execute the instructions to
analyze, using a service analyzer of a contact center application, a transcript of a communications session between a customer operating a customer device and a virtual assistant to determine a customer query;
generate, using the service analyzer, the customer query and a search engine, supplemental information from a customer interaction database including extracted information from the transcript and an original conversation between an agent and a customer, the customer interaction database including supplemental information in response to the customer query;
send, by a contact center application, the supplemental information during the communication session or in a subsequent communication session to the customer device by the virtual assistant; and
the contact center application (a) extracting one or more triples describing relationships between entities and objects of the customer query; (b) aligning the one or more triples with a seed dictionary including a collection of linguistic rules based in part on customer-based artifact; (c) extracting one or more topics from the customer query by categorizing text of the customer query and segmenting the customer query into a plurality of discrete bins; and (d) storing one or more aligned triples and one or more topics in the customer interaction database.

15. The apparatus of claim 14, wherein instructions when executed to generate the supplemental information comprise instructions when executed to generate a search query from the customer query and the customer interaction database, execute the search query by a search engine from at least one of internal documents and external documents, and filter results of the search engine.

16. The apparatus of claim 15, wherein the internal documents comprise company-specific documents available over a private intranet.

17. The apparatus of claim 15, wherein the instructions when executed cause the processor to categorize the supplemental information according to one or more of problem domains, technologies, products, and company departments.

* * * * *